(12) United States Patent
Liu et al.

(10) Patent No.: US 12,592,599 B2
(45) Date of Patent: Mar. 31, 2026

(54) STATOR, ELECTRIC MOTOR, COMPRESSOR AND VEHICLE

(71) Applicants: ANHUI WELLING AUTO PARTS CO., LTD., Hefei (CN); GUANGDONG WELLING AUTO PARTS CO., LTD., Foshan (CN)

(72) Inventors: Haitao Liu, Hefei (CN); Guowei Sun, Hefei (CN); Fubiao Zhang, Hefei (CN)

(73) Assignees: ANHUI WELLING AUTO PARTS CO., LTD., Hefei (CN); GUANGDONG WELLING AUTO PARTS CO., LTD., Foshan (CN)

( * ) Notice: Subject to any disclaimer, the term of this patent is extended or adjusted under 35 U.S.C. 154(b) by 263 days.

(21) Appl. No.: 18/237,609

(22) Filed: Aug. 24, 2023

(65) Prior Publication Data

US 2023/0402892 A1 Dec. 14, 2023

Related U.S. Application Data

(63) Continuation of application No. PCT/CN2022/087020, filed on Apr. 15, 2022.

(30) Foreign Application Priority Data

May 17, 2021 (CN) .......................... 202110536641.9
May 17, 2021 (CN) .......................... 202121050468.3

(51) Int. Cl.
 *H02K 3/32* (2006.01)
 *F25B 31/02* (2006.01)
 *H02K 1/14* (2006.01)

(52) U.S. Cl.
 CPC ............. *H02K 3/325* (2013.01); *F25B 31/02* (2013.01); *H02K 1/148* (2013.01)

(58) Field of Classification Search
 CPC .......... H02K 1/148; H02K 3/34; H02K 3/345; H02K 2213/03; H02K 15/106; H02K 15/108
 See application file for complete search history.

(56) References Cited

U.S. PATENT DOCUMENTS

| | | | |
|---|---|---|---|
| 8,981,614 B2 | 3/2015 | Oka et al. | |
| 2012/0080976 A1* | 4/2012 | Oka | H02K 3/34 |
| | | | 310/25 |

(Continued)

FOREIGN PATENT DOCUMENTS

| | | |
|---|---|---|
| CN | 102474146 A | 5/2012 |
| CN | 103312096 A | 9/2013 |

(Continued)

OTHER PUBLICATIONS

U.S. Appl. No. 18/237,609, filed Jul. 5, 2025_EP_0748025_A2_H.pdf (Year: 2025).*

(Continued)

*Primary Examiner* — Christopher M Koehler
*Assistant Examiner* — Ahmed F Seck
(74) *Attorney, Agent, or Firm* — Scully, Scott, Murphy & Presser, P.C.

(57) ABSTRACT

A stator, an electric motor, a compressor and a vehicle are provided. The stator has a stator core, windings and first insulators. The stator core has multiple tooth portions distributed along a circumferential direction of the stator core. A stator slot is provided between two adjacent tooth portions. The windings are wound around the tooth portions and extends into the stator slots. At least parts of the first insulators are located at gaps between the windings on two adjacent tooth portions. Each first insulator has a first insulation portion and a second insulation portion connected to each other. In the same stator slot, the first insulation portion is in contact with one group of the windings, and the (Continued)

second insulation portion is in contact with another group of the windings. In a cross-section perpendicular to an axial direction of the stator core, the length of the first insulation portion is greater than the length of the second insulation portion.

20 Claims, 5 Drawing Sheets

(56) References Cited

U.S. PATENT DOCUMENTS

| | | | | |
|---|---|---|---|---|
| 2015/0214804 | A1 * | 7/2015 | Katsuragi | H02K 3/34 |
| 2017/0302118 | A1 * | 10/2017 | Tamaki | H02K 3/522 |
| 2019/0074735 | A1 * | 3/2019 | Shono | H02K 15/021 |

FOREIGN PATENT DOCUMENTS

| | | | | | |
|---|---|---|---|---|---|
| CN | 113300503 | A | | 8/2021 | |
| CN | 215733695 | U | | 2/2022 | |
| EP | 0748025 | A2 * | 12/1996 | | H02K 1/148 |
| JP | H10126997 | A | | 5/1998 | |
| JP | 2002233092 | A * | 8/2002 | | |
| JP | 2004112861 | A | | 4/2004 | |
| JP | 2005184994 | A | | 7/2005 | |
| JP | 2012178933 | A | | 9/2012 | |
| JP | 2015109738 | A | | 6/2015 | |
| JP | 2017093096 | A | | 5/2017 | |
| JP | 2017204975 | A | | 11/2017 | |
| JP | 2018074848 | A | | 5/2018 | |
| JP | 2018164357 | A | | 10/2018 | |
| WO | WO-2017064782 | A1 * | 4/2017 | | F04C 23/02 |
| WO | WO-2018159182 | A1 * | 9/2018 | | H02K 3/34 |
| WO | WO-2020238160 | A1 * | 12/2020 | | H02K 3/325 |

OTHER PUBLICATIONS

U.S. Appl. No. 18/237,609, filed Jul. 5, 2025_JP_2002233092_A_H.pdf (Year: 2025).*

U.S. Appl. No. 18/237,609, filed Jul. 5, 2025_WO_2017064782_A1_H.pdf (Year: 2025).*

U.S. Appl. No. 18/237,609, filed Jul. 5, 2025_WO_2020238160_A1_H.pdf (Year: 2025).*

U.S. Appl. No. 18/237,609, filed Jul. 9, 2025_WO_2018159182_A1_H.pdf (Year: 2025).*

First Office Action dated Feb. 11, 2025 for Chinese Patent Application No. 202110536641.9.

Extended European search report dates Jun. 27, 2024 received in European Patent Application No. EP 22803707.3.

International Search Report dated May 31, 2022 issued in PCT/CN2022/087020.

Notice of Reasons for Refusal dated May 14, 2024 received in Japanese Patent Application No. JP 2023-541073.

Request for the Submission of an Opinion dated Jul. 1, 2024 received in Korean Patent Application No. KR 10-2023-7022662.

Search report dated Jul. 9, 2025 received in Chinese Patent Application No. 202110536641.9.

* cited by examiner

110

1104

1102

STATOR, ELECTRIC MOTOR, COMPRESSOR AND VEHICLE

CROSS-REFERENCE TO RELATED APPLICATIONS

This application is a continuation application of PCT International Patent Application No. PCT/CN2022/087020, filed on Apr. 15, 2022, which claims priority to Chinese Patent Application No. 202110536641.9 filed with China National Intellectual Property Administration on May 17, 2021 and entitled "Stator, electric motor, compressor, and vehicle", and Chinese Patent Application No. 202121050468.3 filed with China National Intellectual Property Administration on May 17, 2021 and entitled "Stator, electric motor, compressor, and vehicle", the entire contents of each of which are incorporated herein by reference for all purposes. No new matter has been introduced.

FIELD

The present disclosure relates to the field of electric motors, and particularly relates to a stator, an electric motor, a compressor, and a vehicle.

BACKGROUND

At present, permanent magnet motors have been widely used in air conditioners, automobile compressors and other fields. Under double restraints of energy efficiency improvement and functional requirements, a power density, efficiency and reliability of an electric motor have been required to improve gradually. Gradual improvement in requirements for a motor power level and reliability has presented challenges to insulation performance of stators of electric motors. When a stator uses concentrated windings, improvement in a power density of an electric motor requires full use of an area of a stator slot. There is a small gap between copper wires wound around two teeth in a single stator slot. In order to ensure electrical safety, windings on different teeth in the same slot need to be isolated from each other through phase insulation. In this way, insulation performance of the electric motor can be ensured, and electrical faults such as winding burning caused by insulation breakdown during live line work of the electric motor can be prevented. Further, reliability of the electric motor can be ensured.

In the prior art, in a phase insulation structure, stator slots at two sides have asymmetric areas, resulting in waste of slot areas and two bent positions, and automation simplicity and reliability are reduced. In another motor insulation structure, slot insulation and phase insulation are integrated. A procedure of cutting off an insulation film is added in a process of forming separated stator core into an annular shape, and an insulation shape is complex, and difficulty of separating the core and forming a circle is increased. In addition, if the phase insulation has an unreasonable size or the phase insulation is damaged or falls off, a creepage distance between phases of the windings will be insufficient. Once the electric motor runs with loads, there is a risk of phase-to-phase failure.

SUMMARY

The present disclosure aims to at least solve the problems in the prior art or related art.

In view of this, a first aspect of the present disclosure provides a stator.

A second aspect of the present disclosure further provides an electric motor.

A third aspect of the present disclosure further provides a compressor.

A fourth aspect of the present disclosure further provides a vehicle.

In view of this, the first aspect of the present disclosure provides a stator. The stator includes: a stator core, where the stator core includes a plurality of tooth portions, the plurality of tooth portions are distributed along the circumferential direction of the stator core, and a stator slot is provided between the two adjacent tooth portions; windings wound around the tooth portions and extending into the stator slots; and first insulators, where at least parts of the first insulators are located at gaps between the windings on the two adjacent tooth portions, the first insulator includes a first insulation portion and a second insulation portion connected to each other, and within the same stator slot, the first insulation portion is in contact with one group of the windings, and the second insulation portion is in contact with another group of the windings, where in a cross-section perpendicular to an axial direction of the stator core, the length of the first insulation portion is greater than the length of the second insulation portion.

The stator provided in the present disclosure includes the stator core, the windings, and the first insulators. The stator core includes the plurality of tooth portions, and the plurality of tooth portions are distributed along the circumferential direction of the stator core. The stator slot is provided between the two adjacent tooth portions. The windings are wound around the tooth portions, and located in the stator slots. In addition, the first insulators are inserted into the gaps between the windings on the two adjacent tooth portions, and at least parts of the first insulators are located at the gaps between the windings on the two adjacent tooth portions. In this way, the windings in the stator slots can be effectively and physically isolated, and insulation reliability can be ensured. In some embodiments, the first insulator includes the first insulation portion and the second insulation portion. The first insulation portion is connected to the second insulation portion. Moreover, in the cross-section perpendicular to the axial direction of the stator core, the length of the first insulation portion is greater than the length of the second insulation portion. That is, when the first insulator is folded, the length of the first insulation portion folded in half is greater than the length of the second insulation portion folded in half. Compared with a symmetrical structure having two sides of the same length in the prior art, the above structure can reduce material consumption of the first insulators, and reduce material cost. In addition, within the same stator slot, the first insulation portion is in contact with one group of the windings, and the second insulation portion is in contact with another group of the windings. That is, the first insulator connects the two adjacent groups of windings simultaneously. In this way, the first insulator abuts against the two adjacent groups of windings through an elastic force formed by bending of the first insulator, and a fixing effect is enhanced, a problem that insulation falls off when only a single piece of insulation paper is used for phase-to-phase isolation in the prior art is effectively solved, and a fixing effect of the first insulators is enhanced while insulation reliability of the first insulators is ensured.

In further embodiments, in a process of inserting the first insulators into the gaps between the windings on the two adjacent tooth portions, at least parts of the first insulators are located at the gaps between the windings on the two adjacent tooth portions. In this way, the adjacent windings in the stator slots can be isolated and insulated. Further, the first insulator includes the first insulation portion and the second insulation portion connected to each other. Moreover, when the first insulator is folded in half, the length of the first insulation portion folded in half is greater than the length of the second insulation portion folded in half, and the first insulator is folded in half by itself to form an elastic structure. In this way, within the same stator slot, the first insulator folded in half may abut against every two adjacent windings to support and fix the windings. Further, insulation reliability when an electric motor is running can be improved, and position fixing stability in the stator slots can be improved. In this way, problems that the electric motor runs with loads and further risks are caused because a creepage distance between phases of the windings may be insufficient when the first insulators have an unreasonable size or the first insulators are damaged or fall off in the prior art can be solved. In addition, the length of the first insulation portion folded in half is greater than the length of the second insulation portion folded in half, and material consumption is small, material cost is low, a model is simple, the stator is easy to produce and machine, and production cost is low. In addition, the first insulators are made of polyphenylene sulfide (PPS), which has a desirable insulation effect, high temperature resistance and strong compatibility with a working environment.

Therefore, according to the stator provided in the present disclosure, the first insulators are optimized, that is, the length of the first insulation portions and the length of the second insulation portion are optimized, and the stator is high in insulation reliability and fixability, prone to automatic production, and low in cost.

The stator provided in the present disclosure may further have the following additional features:

In the above embodiment, further, the stator further includes second insulators arranged in the stator slots, where at least parts of the second insulators extend along slot walls of the stator slots, and at least parts of the windings are connected to the tooth portions by the second insulators.

In this embodiment, the stator further includes the second insulators. The second insulators are arranged in the stator slots, where the second insulators extend along the slot walls of the stator slots, and the windings are connected to the tooth portions by the second insulators. That is, the second insulators are arranged along inner walls of the stator slots, and the windings are connected to the tooth portions by the second insulators, and the first insulator may be inserted into the stator slot defined by two adjacent cores in the axial direction of the cores. In this way, the windings in the stator slots are physically isolated, and insulation reliability of the first insulators during use is improved.

In specific applications, the first insulator employs phase insulation, and the second insulator employs slot insulation. It may be understood that windings of different phases are wound around the two adjacent tooth portions, the phase insulation is employed between the windings of different phases on the two adjacent tooth portions, and is configured to insulate the windings of different phases, and the slot insulation is configured to insulate an inner wall surface of the stator slot and the windings are wound around the tooth portions by the slot insulation to play an insulation role.

In any one of the above embodiments, further, the second insulator includes a protrusion, the second insulation portion and the protrusion are located on the same side of the first insulation portion, and the first insulation portion is connected to the protrusion; and in the cross-section perpendicular to the axial direction of the stator core, the length of the first insulation portion is H1, the length of the second insulation portion is H2, the length of the protrusion is H3, and a difference between H1 and H2 is greater than H3.

In this embodiment, the second insulator includes the protrusion. The protrusion and the second insulation portion are arranged on the same side of the first insulation portion, and the first insulation portion is connected to the protrusion. A difference between the length of the first insulation portion and the length of the second insulation portion is greater than the height of the protrusion. That is, the sum of the length of the second insulation portion and the length of the protrusion is less than the length of the first insulation portion. In this way, when the first insulator is mounted in the stator slot, due to settings of the lengths, interference between the second insulation portion and the protrusion is avoided, and assembly reliability is ensured.

In specific applications, when the stator is assembled, the second insulator is mounted in the stator slot, and then the first insulator is inserted into the stator slot, and interference between the first insulator and the second insulator can be avoided through the above size settings.

Further, the first insulation portion and the second insulation portion of the first insulator are located at two sides of the protrusion of the second insulator, respectively. The first insulation portion folded in half and the second insulation portion folded in half have different lengths, that is, the length of the first insulation portion folded in half is greater than the length of the second insulation portion folded in half, and the second insulation portion cannot be in contact with the protrusion when the first insulation portion is in contact with the protrusion. In this way, three insulation layers including the first insulation portion, the protrusion and the second insulation portion are formed between the adjacent windings at an inner bottom of the stator slot, and reliability of insulation between the windings is effectively improved.

In some embodiments, in the cross-section perpendicular to the axial direction of the stator core, heights of the first insulation portion, the second insulation portion and the protrusion are set to be H1, H2, and H3, respectively, and the difference between H1 and H2 is greater than H3. On one hand, in a process of inserting the first insulator into the stator slot, the length of the first insulation portion folded in half is greater than the length of the second insulation portion folded in half, and a difference between the length of the first insulation portion and the length of the second insulation portion is greater than the height of the protrusion. In this way, when the first insulator is inserted into the stator slot, interference between the second insulation portion and the protrusion is avoided, and further assembly efficiency is improved. On the other hand, the length of the first insulation portion folded in half is greater than the length of the second insulation portion folded in half, and the second insulation portion cannot be in contact with the protrusion when the first insulation portion is in contact with the protrusion. In this way, three insulation layers including the first insulation portion, the protrusion and the second insulation portion are formed between the adjacent windings at the inner bottom of the stator slot, and insulation reliability of the first insulator between the windings is further improved.

In any one of the above embodiments, further, insulation frames are arranged at two ends of the stator core in the axial direction of the stator core, and the windings are wound around the tooth portions covered with the insulation frames and the second insulators.

In this embodiment, the insulation frames are arranged at the two ends of the stator core in the axial direction of the stator core. The windings are wound around the tooth portions covered with the insulation frames and the second insulators. In this way, an operation region of the stator is formed through winding of the windings and located in the stator slot, and then the first insulator is inserted into the gap between the windings on the two adjacent tooth portions, and the windings in the stator slot are physically isolated, and insulation reliability in a motor operation process is improved.

Meanwhile, the first insulator and the second insulator effectively isolate the windings in the stator slot, and the insulation frames arranged at the two ends of the stator core further isolate the winding at an end of the stator core, and connection reliability between the winding and the stator core is improved.

In specific applications, the insulation frames are made of an insulation material.

In any one of the above embodiments, further, the first insulator is configured with a folding position, and the first insulator has at least a first state and a second state; and in the first state, the first insulator is unfolded, and the first insulation portion and the second insulation portion are adjacent to each other; and in the second state, the first insulator is folded along the folding position and the first insulation portion and the second insulation portion are opposite each other.

In this embodiment, the first insulator is configured with the folding position, and the first insulator has at least the first state and the second state. That is, the first insulator may be unfolded or folded according to the folding position, and the first insulator may be unfolded in the first state and folded in the second state. With the folding position configured, when the first insulator may be folded according to the folding position when being folded by other devices. In this way, lengths and sizes of the first insulation portion and the second insulation portion are ensured, and reliability of a structure formed by folding the first insulator is improved. Further, an assembly condition of the first insulator and the second insulator is ensured, and an insulation effect of the first insulator and the second insulator is improved.

In some embodiments, a use state of the first insulator may be changed according to use requirements in a process of using the first insulator. In the first state, the first insulator is unfolded, and the first insulation portion and the second insulation portion are adjacent to each other. That is, the first insulation portion and the second insulation portion are connected to each other and are located in the same plane. In this case, the first insulation portion and the second insulation portion are arranged in a "straight line" shape as a whole. In the second state, the first insulation portion and the second insulation portion are opposite each other. That is, the first insulation portion and the second insulation portion are arranged in a "U" shape as a whole. The first insulator is set to have at least the first state and the second state, and a use shape of the first insulator may be changed according to assembly requirements, and use adaptability is improved.

Meanwhile, when the first insulator is in the second state, the first insulation portion and the second insulation portion abut against the two adjacent groups of windings respectively when the first insulator is inserted into the gap between the windings on the two adjacent tooth portions through the elastic force formed by bending of the first insulator. In this way, the first insulation portion and the second insulation portion play a fixing and supporting role, a probability that insulation may easily fall off when only a single insulator is used for phase-to-phase isolation is eliminated, and further insulation reliability of the first insulator between the windings is improved.

In any one of the above embodiments, further, in the axial direction of the stator core, the first end of the first insulator is provided with a convex portion, and the first insulator extends into the stator slot by grasping the convex portion.

In this embodiment, in the axial direction of the stator core, the first end of the first insulator is provided with the convex portion, and a device fixture may grasp the first insulator, and further the first insulator may be accurately inserted into the stator slot.

In some embodiments, in a process of inserting the first insulator into the gap between the windings on the two adjacent tooth portions, the device fixture grasps the first insulator and inserts the first insulator into the stator slot. Therefore, in the axial direction of the stator core, the first end of the first insulator is provided with the convex portion, and the device fixture may stably grasp the first insulator and accurately insert the first insulator, and further automation capability of a device is improved.

In any one of the above embodiments, further, in the axial direction of the stator core, the length of the stator core is L1, the difference between the length of the first insulator and the length of the convex portion is L2, and L2 minus L1 is greater than or equal to 7 mm.

In this embodiment, in the axial direction of the stator core, the length of the stator core is set to be L1, a length of the first insulator without the convex portion at the first end is set to be L2, and a length difference between L2 and L1 is set to be greater than or equal to 7 mm. When the first insulator is mounted in the stator slot, on one hand, at least part of the convex portion may protrude from the stator core to facilitate assembly and disassembly of the first insulator; and on the other hand, a size of part, in the stator slot, of the first insulator may be ensured to be greater than or equal to that of the stator slot, and an insulation effect of the first insulator on the adjacent windings is ensured, and further reliability of insulation between the windings at the ends of the stator slots is enhanced.

In some embodiments, in a working process of the stator, a process size determined by the height of the windings at the end of the stator slot is considered, that is, insulation breakdown between the windings at the end is prevented while insulation performance of straight sections of every two adjacent windings in the stator slot is ensured. Therefore, the length difference between L2 and L1 is set to be greater than or equal to 7 mm, and insulation breakdown between the windings at the end is effectively avoided, and insulation reliability is enhanced.

In any one of the above embodiments, further, in the first state, the convex portion has a trapezoidal shape, with the upper bottom length as L3, and the lower bottom length as L4, the difference between L4 and L3 is greater than or equal to 1 mm.

In this embodiment, when the first insulator is in the first state, that is, the first insulator is in a flat state, the convex portion at the first end of the first insulator has a trapezoidal shape. The lengths of the upper bottom and the lower bottom of the convex portion are set to be L3 and L4, respectively, and a difference between L4 and L3 is greater than or equal to 1 mm. In this way, a device fixture may grasp the first insulator, and further the first insulator may be accurately inserted into the stator slot.

In some embodiments, in a process of inserting the first insulator into the gap between the windings on the two adjacent tooth portions, that is, in a process of inserting the first insulator into the stator slot, the device fixture grasps the first insulator and inserts the first insulator into the stator slot. Therefore, when the first insulator is in the first state, the lengths of the upper bottom and the lower bottom of the convex portion are set to be L3 and L4, respectively, and the difference between L4 and L3 is set to be greater than or equal to 1 mm. In this way, the device fixture may stably grasp the first insulator and accurately insert the first insulator, and further the automation capability of the device is improved.

In some embodiments, the difference between L4 and L3 is greater than or equal to 1 mm and less than or equal to 10 mm. Further, the difference between L4 and L3 is greater than or equal to 2 mm and less than or equal to 5 mm.

In any one of the above embodiments, further, the height of the convex portion is greater than or equal to 2.5 mm and less than or equal to 15 mm.

In this embodiment, the height of the convex portion of the first insulator is set within a certain range, and grasping operability of the device fixture is improved advantageously, and further grasping efficiency of the device fixture is improved.

In some embodiments, in the process of inserting the first insulator into the stator slot, grasping is conducted by the device fixture. If the height of the convex portion of the first insulator is too small, grasping operability of the device fixture may be affected. Therefore, the height of the convex portion is set to be greater than or equal to 2.5 mm and less than or equal to mm. In this case, grasping efficiency of the device fixture is highest and automation capability of the device is strongest. A specific height of the convex portion may be determined according to an actual process.

In specific applications, the height of the convex portion is greater than or equal to 5 mm and less than or equal to 10 mm. Further, the height of the convex portion is of 6 mm, 7 mm, 8 mm, or 9 mm.

In any one of the above embodiments, further, in the axial direction of the stator core, a second end of the first insulator is provided with a concave portion, and the concave portion and the convex portion are opposite each other.

In this embodiment, in the axial direction of the stator core, the second end of the first insulator is provided with the concave portion. The convex portion and the concave portion are opposite each other. That is, one end of the first insulator in the axial direction includes a trapezoidal convex portion, and the other end of the first insulator in the axial direction includes a trapezoidal concave portion having the same shape and size as the trapezoidal convex portion. The convex portion facilitates grasping of the first insulator by the device fixture, and the concave portion is arranged to avoid collision and interference between the first insulator and the insulation frame when the first insulator is inserted into the stator slot. In this way, the first insulator is accurately inserted into the stator slot, and further the automation capability of the device is improved.

In any one of the above embodiments, further, a center line of the concave portion coincides with a center line of the convex portion.

In this embodiment, the center line of the convex portion of the first insulator is set to coincide with the center line of the concave portion of the first insulator, and the convex portion and the concave portion may be folded in half along the center line in a process of folding the first insulator in half, and further straightness of the entire first insulator is ensured. In this way, smoothness and accuracy of inserting the first insulator into the stator slot in the axial direction are improved.

In any one of the above embodiments, further, the concave portion has the same shape as the convex portion.

In this embodiment, the convex portion of the first insulator is set to have the same shape as the concave portion of the first insulator, and it is further ensured that the center line of the convex portion may coincide with the center line of the concave portion, and further the convex portion and the concave portion may be folded in half along the center line. In this way, smoothness and accuracy of inserting the first insulator into the stator slot in the axial direction are improved. Meanwhile, the convex portion has the same shape as the concave portion, and the convex portion and the concave portion have a simpler structure, and are easy to produce and machine, and production cost is effectively reduced.

In any one of the above embodiments, further, the stator further includes a transition section, where the first insulation portion is connected to the second insulation portion by the transition section, and the folding position is located in the transition section.

In this embodiment, the first insulator further includes the transition section. In some embodiments, the first insulation portion is connected to the second insulation portion by the transition section, that is, the first insulation portion and the second insulation portion are connected into a whole by the transition section, and the folding position is located in the transition section. In this way, the first insulation portion and the second insulation portion may be folded in half along the folding position, and further the first insulation portion folded in half may have a greater length than the second insulation portion folded in half. Compared with a symmetrical structure having two sides of the same length in the prior art, the above structure can reduce material consumption of the first insulators, and reduce material cost. Meanwhile, the first insulation portion and the second insulation portion are folded in half along the folding position, and an arc-shaped transition section is formed at a joint where the first insulation portion and the second insulation portion are folded in half, that is, the transition section is U-shaped after the first insulator is folded in half along the folding position. After being folded in half, the first insulator is bent by itself, and further a supporting elastic force exists between the first insulation portion and the second insulation portion. In this way, when the first insulator is inserted into the gap between the windings on the two adjacent tooth portions, the first insulation portion and the second insulation portion may abut against the two adjacent groups of windings by their own elastic force, and a fixing effect is enhanced, and insulation reliability is improved.

In any one of the above embodiments, further, the number of the stator slots is multiple, and at least parts of the stator slots are internally provided with the first insulators.

In this embodiment, the number of the first insulators is set to be multiple, and at least parts of the stator slots each accommodate a first insulator. Further, the windings in stator slots can be physically isolated to ensure insulation reliability.

In some embodiments, the number of the stator slots may be set to be the same as that of the first insulators. In this way, the first insulators can insulate and isolate the windings in all the stator slots, and insulation reliability of an electric motor during operation is effectively improved. For instance, the number of the stator slots is set to be 12, and the number of the first insulators is set to be 12, that is, the number of the stator slots is equal to that of the first insulators, and each stator slot accommodates a first insulator. In this way, an insulation and isolation state of the first insulators in the stator slots is optimal, and insulation reliability is ensured.

Certainly, the number of the first insulators may further be less than that of the stator slots.

In any one of the above embodiments, further, the thickness of the first insulator is greater than or equal to 0.25 mm and less than or equal to 0.3 mm.

In this embodiment, the thickness of the first insulator is set to be 0.25 mm-0.3 mm, that is, thicknesses of the first insulation portion and the second insulation portion are set to be greater than or equal to 0.25 mm and less than or equal to 0.3 mm, and insulation and voltage resistance requirements between the adjacent windings in the stator slot are ensured. Further, on one hand, by setting a thickness range of the first insulators, insulation breakdown between the adjacent windings can be effectively prevented, and insulation reliability can be enhanced. On the other hand, by setting a thickness range of the first insulators, when the first insulator is folded in half, the elastic force of the first insulator folded in half, that is, the supporting elastic force between the first insulation portion and the second insulation portion, can be improved. Further, when the first insulator is inserted into the gap between the windings on the two adjacent tooth portions, the first insulator may abut against the two adjacent groups of windings by its own elastic force, and a fixing effect is enhanced, and insulation reliability is improved.

In any one of the above embodiments, further, the stator core includes a plurality of block cores, and the plurality of block cores are connected sequentially in the circumferential direction of the stator core.

In this embodiment, the stator core includes the plurality of block cores. The plurality of block cores are connected sequentially in the circumferential direction of the stator core. In this way, the stator slot may be defined between every two adjacent block cores. Further, the stator slots are circumferentially arranged in the axial direction of the stator core, and the windings are wound around the tooth portions and located in the stator slots. Meanwhile, the first insulators are further arranged in the circumferential direction of the electric motor and correspondingly inserted into the stator slots, to physically isolate the windings in the stator slots, and insulation reliability is achieved.

Further, the stator core includes the plurality of block cores. When the windings are wound, the winding may be wound around each block core. After winding of all the block cores is completed, the plurality of block cores form a circle. The above arrangement effectively improves a slot fill factor of the stator.

In any one of the above embodiments, further, any one of the block cores includes a plurality of laminations, and the plurality of laminations are stacked in the axial direction of the stator core.

In this embodiment, each block core includes the plurality of laminations, and the plurality of laminations are stacked in the axial direction of the stator core. In this way, overlapping portions are formed on peripheral edges of the laminations, and when the plurality of laminations are stacked in the axial direction of the core, overlapping gaps are defined between the adjacent laminations and are formed in the stator slots, and the windings may be wound around the tooth portions and located in the stator slots. When the first insulator is inserted into the gap between the windings on the two adjacent tooth portions, the windings in the stator slot are effectively and physically isolated, and further insulation reliability is ensured.

In some embodiments, the laminations are silicon steel sheets.

In any one of the above embodiments, further, in the same block core, the plurality of laminations include a first type of laminations and a second type of laminations overlapping each other; in the circumferential direction of the stator core, first sides of the first type of laminations are provided with overlapping portions, and second sides of the first type of laminations are provided with notch portions; second sides of the second type of laminations are provided with the overlapping portions, and first sides of the second type of laminations are provided with the notch portions; and in the axial direction of the stator core, the two adjacent overlapping portions are located on two sides of the notch portion and define a gap, and in the two adjacent block cores, the overlapping portion of one of the block cores is inserted into a gap of another block core.

In this embodiment, the plurality of laminations include the first type of laminations and the second type of laminations, and the first type of laminations and the second type of laminations are distributed alternately along the axial direction of the stator core. In the circumferential direction of the stator core, the first sides of the first type of laminations are provided with the overlapping portions, and the second sides of the first type of laminations are provided with the notch portions; and meanwhile, the first sides of the second type of laminations are provided with the notch portions, and the second sides of the second type of laminations are provided with the overlapping portions. In this way, in the axial direction of the stator core, at two sides of the notch portion, the two adjacent overlapping portions may define a gap, and an overlapping portion of one of the two adjacent block cores is inserted into a gap of another block core, and further a slot fill factor of the stator is improved.

In some embodiments, when the first type of laminations and the second type of laminations are distributed alternately along the axial direction of the stator core, an interval exists between the overlapping portions of two adjacent ones of the first type of laminations at the first side, and the overlapping gap of the first side is directly defined at the notch portion of the second type of laminations between the two adjacent ones of the first type of laminations. Accordingly, an interval exists between the overlapping portions of two adjacent ones of the second type of laminations at the second side, and the overlapping gap of the second side is directly defined at the notch portion of the first type of laminations between the two adjacent ones of the second type of laminations. In this way, an overlapping portion of a block core may be inserted into a gap of another block core, and a slot fill factor of the stator can be improved. Meanwhile, after insertion of all the block cores is completed, the plurality of block cores form a circle, and a slot fill factor of the stator can be further improved, and motor power during motor operation can be further enhanced.

A second aspect of the present disclosure provides an electric motor. The electric motor includes: the stator according to the first aspect of the present disclosure; and a rotor cooperating with the stator to rotate.

The electric motor provided in the present disclosure includes the stator according to the first aspect of the present disclosure, so the electric motor has all the beneficial effects of the above stator, which will not be described in details herein.

In addition, the electric motor further includes a rotor. The rotor is arranged inside the stator and may cooperate with the stator to rotate and further output torque.

A third aspect of the present disclosure provides a compressor. The compressor includes: the stator according to the first aspect of the present disclosure; or the electric motor according to the second aspect of the present disclosure.

The compressor provided in the present disclosure includes the stator according to the first aspect of the present disclosure, or the electric motor according to the second aspect of the present disclosure, so the compressor has all the beneficial effects of the above stator, which will not be described in details herein.

A fourth aspect of the present disclosure provides a vehicle. The vehicle includes: the compressor according to the third aspect of the present disclosure.

The vehicle provided in the present disclosure includes the compressor according to the third aspect of the present disclosure, so the vehicle has all the beneficial effects of the above compressor, which will not be described in details herein.

Additional aspects and advantages of the present disclosure will become obvious in the following description, or can be learned by practice of the present disclosure.

BRIEF DESCRIPTION OF THE DRAWINGS

What is described above and/or additional aspects and advantages of the present disclosure will become obvious and comprehensible from the following description of embodiments in conjunction with the accompanying drawings.

A corresponding relation between reference numbers in FIGS. 1-8 and component names is as follows:

100 stator, 110 stator core, 1102 block core, 1104 overlapping portion, 120 winding, 130 first insulator, 1310 first insulation portion, 1320 second insulation portion, 1312 convex portion, 1314 concave portion, 1330 transition section, 140 second insulator, 1402 protrusion, 150 insulation frame.

DETAILED DESCRIPTION OF THE DISCLOSURE

To make the above objectives, features, and advantages of the present disclosure more obvious and comprehensible, the present disclosure will be described in detail below with reference to accompanying drawings and exemplary embodiments. It should be noted that embodiments in the present disclosure and features in the embodiments can be combined with one another if there is no conflict.

Many specific details are set forth in the following description to facilitate full understanding of the present disclosure, but the present disclosure can further be implemented in other ways different from those described herein, and therefore, the protection scope of the present disclosure is not limited by the exemplary embodiments disclosed below.

With reference to FIGS. 1-8, a stator 100, an electric motor, a compressor and a vehicle according to some embodiments of the present disclosure will be described below.

Figure 1:
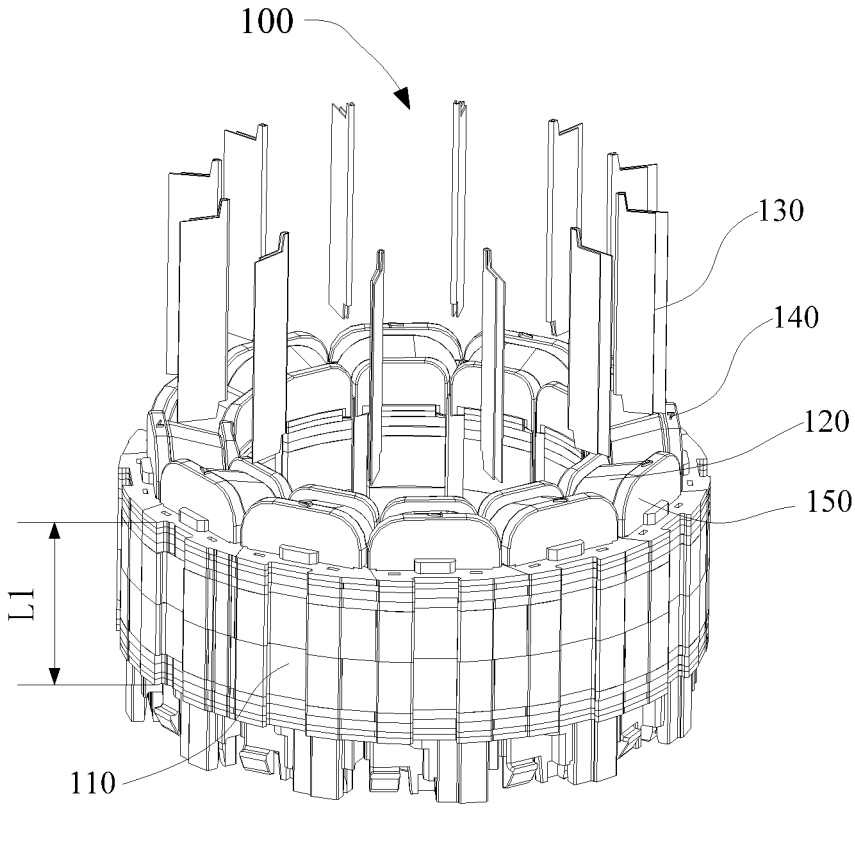
FIG. 1 shows a schematic structural diagram of a stator according to an embodiment of the present disclosure.

As shown in FIG. 1, a first embodiment of the present disclosure provides a stator 100. The stator includes a stator core 110, windings 120, and first insulators 130.

Figures 2, 3:
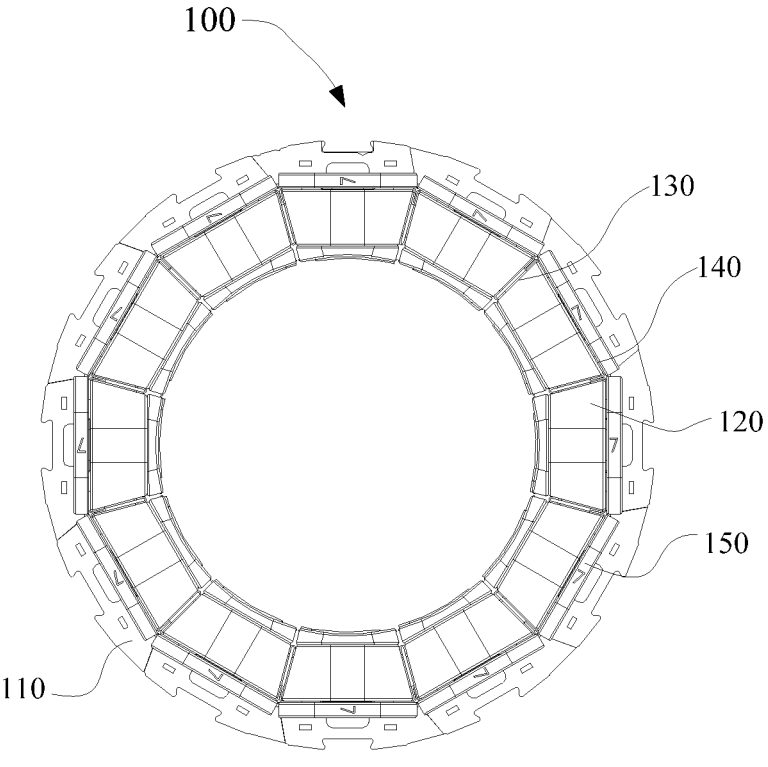
FIG. 2 is a top view of a stator according to the embodiment as shown in FIG. 1.
FIG. 3 is a schematic diagram of a partial structure of a stator according to the embodiment as shown in FIG. 1.

As shown in FIGS. 1 and 2, the stator core 110 includes a plurality of tooth portions, and the plurality of tooth portions are distributed along a circumferential direction of the stator core 110. A stator slot is provided between the two adjacent tooth portions. The windings 120 are wound around the tooth portions, and located in the stator slots. In addition, the first insulators 130 are inserted into gaps between the windings 120 on the two adjacent tooth portions, and at least parts of the first insulators 130 are located at the gaps between the windings 120 on the two adjacent tooth portions. In this way, the windings 120 in the stator slots can be effectively and physically isolated, and insulation reliability can be ensured.

In some embodiments, as shown in FIGS. 1-5, the first insulator 130 includes a first insulation portion 1310 and a second insulation portion 1320. The first insulation portion 1310 is connected to the second insulation portion 1320. Moreover, in a cross-section perpendicular to an axial direction of the stator core 110, the length of the first insulation portion 1310 is greater than the length of the second insulation portion 1320. That is, when the first insulator 130 is folded, the length of the first insulation portion 1310 folded in half is greater than the length of the second insulation portion 1320 folded in half. Compared with a symmetrical structure having two sides of the same length in the prior art, the above structure can reduce material consumption of the first insulators 130, and reduce material cost. In addition, within the same stator slot, the first insulation portion 1310 is in contact with one group of the windings 120, and the second insulation portion 1320 is in contact with another group of the windings 120. That is, the first insulator 130 connects the two adjacent groups of windings 120 simultaneously. In this way, the first insulator 130 abuts against the two adjacent groups of windings 120 through an elastic force formed by bending of the first insulator, and a fixing effect is enhanced, a problem that insulation falls off when only a single piece of insulation paper is used for phase-to-phase isolation in the prior art is effectively solved, and a fixing effect of the first insulators 130 is enhanced while insulation reliability of the first insulators 130 is ensured.

Figure 5:
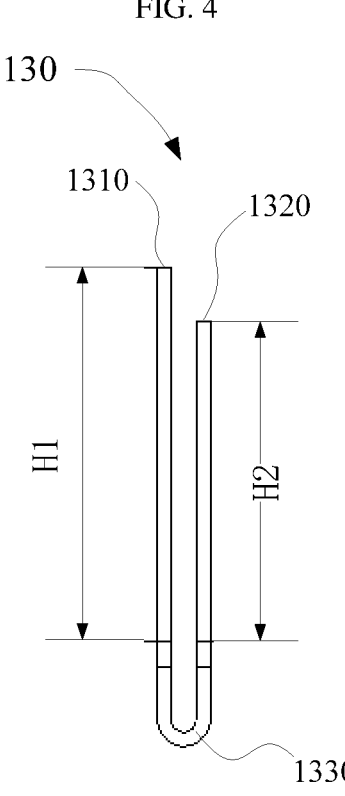
FIG. 5 is a schematic diagram of a folded state (a second state) of a first insulator according to the embodiment as shown in FIG. 4.

In further embodiments, as shown in FIGS. 1 and 5, in a process of inserting the first insulators 130 into the gaps between the windings 120 on the two adjacent tooth portions, at least parts of the first insulators 130 are located at the gaps between the windings 120 on the two adjacent tooth portions. In this way, the adjacent windings 120 in the stator slots can be isolated and insulated. Further, the first insulator 130 includes the first insulation portion 1310 and the second insulation portion 1320 connected to each other. Moreover, when the first insulator 130 is folded in half, the length of the first insulation portion 1310 folded in half is greater than the length of the second insulation portion 1320 folded in half, and the first insulator 130 is folded in half by itself to form an elastic structure. In this way, within the same stator slot, the first insulator 130 folded in half may abut against every two adjacent windings 120 to support and fix the windings. Further, insulation reliability when an electric motor is running can be improved, and position fixing stability in the stator slots can be improved. In this way, problems that the electric motor runs with loads and further risks are caused because a creepage distance between phases of the windings 120 may be insufficient when the first insulators 130 have an unreasonable size or the first insulators 130 are damaged or fall off in the prior art can be solved. In addition, the length of the first insulation portion 1310 folded in half is greater than the length of the second insulation portion 1320 folded in half, and material consumption is small, material cost is low, a model is simple, the stator is easy to produce and machine, and production cost is low. In addition, the first insulators 130 are made of polyphenylene sulfide (PPS), which has a desirable insulation effect, high temperature resistance and strong compatibility with a working environment.

Figure 4:
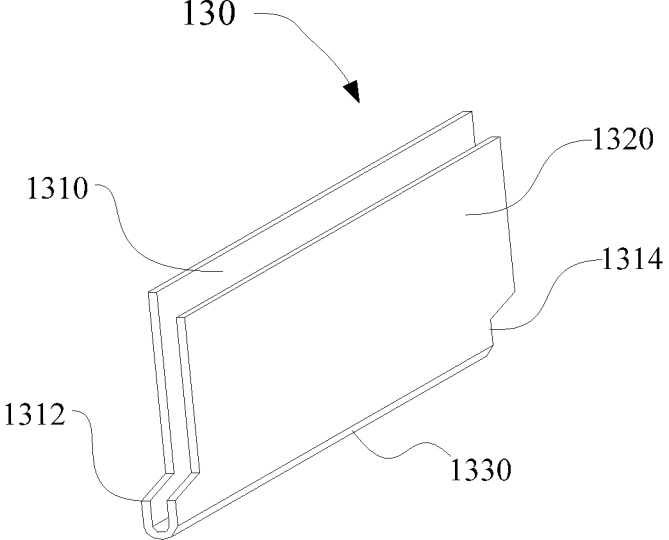
FIG. 4 is a schematic structural diagram of a first insulator according to the embodiment as shown in FIG. 1.

Therefore, according to the stator 100 provided in the present disclosure, as shown in FIGS. 4 and 5, the first insulators 130 are optimized, that is, the length of the first insulation portions 1310 and the length of the second insulation portions 1320 are optimized, and the stator is high in insulation reliability and fixability, prone to automatic production, and low in cost.

A stator 100 is provided according to another embodiment.

In addition to the features described previously, as shown in FIG. 1, the stator 100 further includes second insulators 140. The second insulators 140 are arranged in the stator slots, where the second insulators 140 extend along slot walls of the stator slots, and the windings 120 are connected to the tooth portions by the second insulators 140. That is, the second insulators 140 are arranged along inner walls of the stator slots, and the windings 120 are connected to the tooth portions by the second insulators 140, and the first insulator 130 may be inserted into the stator slot defined by two adjacent cores in the axial direction of the cores. In this way, the windings 120 in the stator slots are physically isolated, and insulation reliability of the first insulators 130 during use is improved.

In specific applications, the first insulator 130 employs phase insulation, and the second insulator 140 employs slot insulation. It may be understood that windings 120 of different phases are wound around the two adjacent tooth portions, the phase insulation is employed between the windings 120 of different phases on the two adjacent tooth portions, and is configured to insulate the windings 120 of different phases, and the slot insulation is configured to insulate an inner wall surface of the stator slot and the windings 120 are wound around the tooth portions by the slot insulation to play an insulation role.

Figure 6:
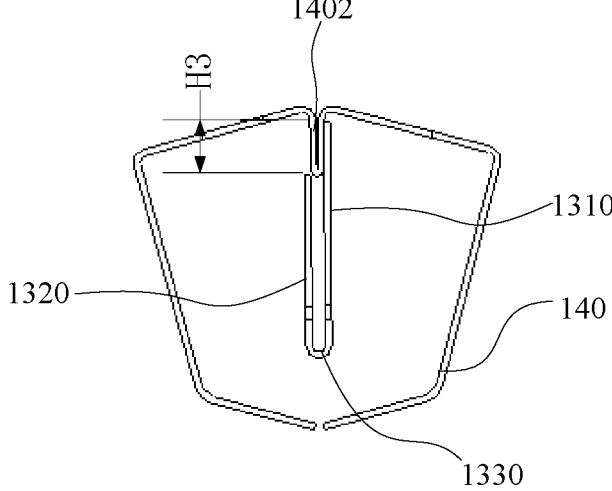
FIG. 6 is a schematic structural diagram of assembly of a first insulator and a second insulator according to the embodiment as shown in FIG. 1.

In this embodiment, further, as shown in FIG. 6, the second insulator 140 includes a protrusion 1402. The protrusion 1402 and the second insulation portion 1320 are arranged on the same side of the first insulation portion 1310, and the first insulation portion 1310 is connected to the protrusion 1402.

As shown in FIG. 6, a difference between the length of the first insulation portion 1310 and the length of the second insulation portion 1320 is greater than the height of the protrusion 1402. That is, the sum of the length of the second insulation portion 1320 and the length of the protrusion 1402 is less than the length of the first insulation portion 1310. In this way, when the first insulator 130 is mounted in the stator slot, due to settings of the lengths, interference between the second insulation portion 1320 and the protrusion 1402 is avoided, and assembly reliability is ensured.

In specific applications, when the stator 100 is assembled, the second insulator 140 is mounted in the stator slot, and then the first insulator 130 is inserted into the stator slot, and interference between the first insulator 130 and the second insulator 140 can be avoided through the above size settings.

Further, the first insulation portion 1310 and the second insulation portion 1320 of the first insulator 130 are located at two sides of the protrusion 1402 of the second insulator 140, respectively. The first insulation portion 1310 folded in half and the second insulation portion 1320 folded in half have different lengths, that is, the length of the first insulation portion 1310 folded in half is greater than the length of the second insulation portion 1320 folded in half, and the second insulation portion 1320 cannot be in contact with the protrusion 1402 when the first insulation portion 1310 is in contact with the protrusion 1402. In this way, three insulation layers including the first insulation portion 1310 and the protrusion 1402 are formed between the adjacent windings 120 at an inner bottom of the stator slot, and reliability of insulation between the windings 120 is effectively improved.

In some embodiments, as shown in FIGS. 1 and 6, in the cross-section perpendicular to the axial direction of the stator core 110, heights of the first insulation portion 1310, the second insulation portion 1320 and the protrusion 1402 are set to be H1, H2, and H3, respectively, and a difference between H1 and H2 is greater than H3. On one hand, in a process of inserting the first insulator 130 into the stator slot, the length of the first insulation portion 1310 folded in half is greater than the length of the second insulation portion 1320 folded in half, and a difference between the length of the first insulation portion 1310 and the length of the second insulation portion 1320 is greater than the height of the protrusion 1402. In this way, when the first insulator 130 is inserted into the stator slot, interference between the second insulation portion 1320 and the protrusion 1402 is avoided, and further assembly efficiency is improved. On the other hand, the length of the first insulation portion 1310 folded in half is greater than the length of the second insulation portion 1320 folded in half, and the second insulation portion 1320 cannot be in contact with the protrusion 1402 when the first insulation portion 1310 is in contact with the protrusion 1402. In this way, three insulation layers including the first insulation portion 1310 and the protrusion 1402 are formed between the adjacent windings 120 at the inner bottom of the stator slot, and insulation reliability of the first insulator 130 between the windings 120 is further improved.

In this embodiment, further, as shown in FIGS. 1 and 3, insulation frames 150 are arranged at two ends of the stator core 110 in the axial direction of the stator core 110. The windings 120 are wound around the tooth portions covered with the insulation frames 150 and the second insulators 140. In this way, an operation region of the stator 100 is formed through winding of the windings 120 and located in the stator slot, and then the first insulator 130 is inserted into the gap between the windings 120 on the two adjacent tooth portions, and the windings 120 in the stator slot are physically isolated, and insulation reliability in a motor operation process is improved.

Meanwhile, the first insulator 130 and the second insulator 140 effectively isolate the windings 120 in the stator slot, and the insulation frames 150 arranged at the two ends of the stator core 110 further isolate the winding 120 at an end of the stator core 110, and connection reliability between the winding 120 and the stator core 110 is improved.

In specific applications, the insulation frames 150 are made of an insulation material.

A stator 100 is provided according to yet another embodiment.

In addition to the features previously described, as shown in FIGS. 4-7, the first insulator 130 is configured with a folding position, and the first insulator 130 has at least a first state and a second state. That is, the first insulator 130 may be unfolded or folded according to the folding position, and the first insulator 130 may be unfolded in the first state and folded in the second state. With the folding position configured, when the first insulator 130 may be folded according to the folding position when being folded by other devices. In this way, lengths and sizes of the first insulation portion 1310 and the second insulation portion 1320 are ensured, and reliability of a structure formed by folding the first insulator 130 is improved. Further, an assembly condition of the first insulator 130 and the second insulator 140 is ensured, and an insulation effect of the first insulator 130 and the second insulator 140 is improved.

Figure 7:
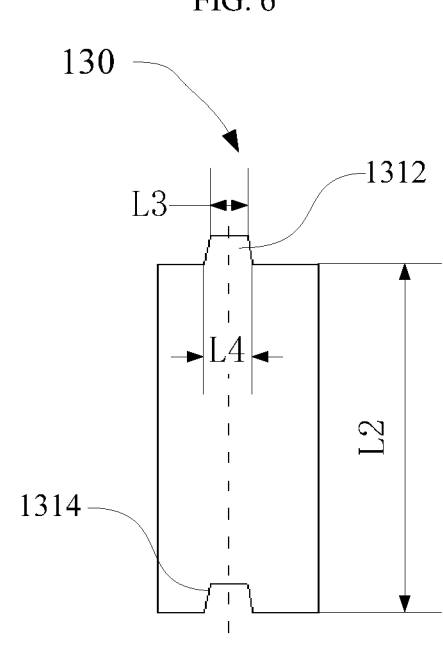
FIG. 7 is a schematic diagram of an unfolded state (a first state) of a first insulator according to the embodiment as shown in FIG. 4.

In some embodiments, as shown in FIGS. 4, 5 and 7, a use state of the first insulator 130 may be changed according to use requirements in a process of using the first insulator 130. In the first state, the first insulator 130 is unfolded, and the first insulation portion 1310 and the second insulation portion 1320 are adjacent to each other. That is, the first insulation portion 1310 and the second insulation portion 1320 are connected to each other and are located in the same plane. In this case, the first insulation portion 1310 and the second insulation portion 1320 are arranged in a "straight line" shape as a whole. In the second state, the first insulation portion 1310 and the second insulation portion 1320 are opposite each other. That is, the first insulation portion 1310 and the second insulation portion 1320 are arranged in a "U" shape as a whole. The first insulator 130 is set to have at least the first state and the second state, and a use shape of the first insulator 130 may be changed according to assembly requirements, and use adaptability is improved. Meanwhile, when the first insulator 130 is in the second state, the first insulation portion 1310 and the second insulation portion 1320 abut against the two adjacent groups of windings 120 respectively when the first insulator 130 is inserted into the gap between the windings 120 on the two adjacent tooth portions through the elastic force formed by bending of the first insulator 130. In this way, the first insulation portion and the second insulation portion play a fixing and supporting role, a probability that insulation may easily fall off when only a single insulator is used for phase-to-phase isolation is eliminated, and further insulation reliability of the first insulator 130 between the windings 120 is improved.

In this embodiment, further, as shown in FIGS. 1 and 4, in the axial direction of the stator core 110, the first end of the first insulator 130 is provided with a convex portion 1312, and a device fixture may grasp the first insulator 130, and further the first insulator 130 may be accurately inserted into the stator slot.

In some embodiments, as shown in FIGS. 1, 4 and 7, in a process of inserting the first insulator 130 into the gap between the windings 120 on the two adjacent tooth portions, the device fixture grasps the first insulator 130 and inserts the first insulator 130 into the stator slot. Therefore, in the axial direction of the stator core 110, the first end of the first insulator 130 is provided with the convex portion 1312, and the device fixture may stably grasp the first insulator 130 and accurately insert the first insulator 130, and further automation capability of a device is improved. When the first insulator 130 is mounted, as shown in FIG. 1, the device inserts the first insulator 130 downward into the stator slot by grasping the convex portion 1312.

In this embodiment, further, as shown in FIGS. 1 and 7, in the axial direction of the stator core 110, the length of the stator core 110 is set to be L1, a length of the first insulator 130 without the convex portion 1312 at the first end is set to be L2, and a length difference between L2 and L1 is set to be greater than or equal to 7 mm. When the first insulator 130 is mounted in the stator slot, on one hand, at least part of the convex portion 1312 may protrude from the stator core 110 to facilitate assembly and disassembly of the first insulator 130; and on the other hand, a size of part, in the stator slot, of the first insulator 130 may be ensured, and the size of the part, in the stator slot, of the first insulator 130 may be greater than or equal to that of the stator slot, and an insulation effect of the first insulator 130 on the adjacent windings 120 is ensured, and further reliability of insulation between the windings 120 at the ends of the stator slots is enhanced.

In some embodiments, as shown in FIGS. 1, 4 and 7, in a working process of the stator 100, a process size determined by the height of the windings 120 at the end of the stator slot is considered, that is, insulation breakdown between the windings 120 at the end is prevented while insulation performance of straight sections of every two adjacent windings 120 in the stator slot is ensured. Therefore, the length difference between L2 and L1 is set to be greater than or equal to 7 mm, and insulation breakdown between the windings 120 at the end is effectively avoided, and insulation reliability is enhanced.

In this embodiment, further, as shown in FIGS. 4, 5 and 7, when the first insulator 130 is in the first state, that is, the first insulator 130 is in a flat state, the convex portion 1312 at the first end of the first insulator 130 has a trapezoidal shape. Lengths of an upper bottom and a lower bottom of the convex portion 1312 are set to be L3 and L4, respectively, and a difference between L4 and L3 is greater than or equal to 1 mm. In this way, a device fixture may grasp the first insulator 130, and further the first insulator 130 may be accurately inserted into the stator slot.

In some embodiments, as shown in FIG. 7, in a process of inserting the first insulator 130 into the gap between the windings 120 on the two adjacent tooth portions, that is, in a process of inserting the first insulator 130 into the stator slot, the device fixture grasps the first insulator 130 and inserts the first insulator 130 into the stator slot. Therefore, when the first insulator 130 is in the first state, the lengths of the upper bottom and the lower bottom of the convex portion 1312 are set to be L3 and L4, respectively, and the difference between L3 and L4 is set to be greater than or equal to 1 mm. In this way, the device fixture may stably grasp the first insulator 130 and accurately insert the first insulator 130, and further the automation capability of the device is improved.

In some embodiments, the difference between L4 and L3 is greater than or equal to 1 mm and less than or equal to 10 mm. Further, the difference between L4 and L3 is greater than or equal to 2 mm and less than or equal to 5 mm.

In some embodiments, further, as shown in FIGS. 4 and 7, the height of the convex portion 1312 the first insulator 130 is set within a certain range, and grasping operability of the device fixture is improved advantageously, and further grasping efficiency of the device fixture is improved.

In some embodiments, as shown in FIGS. 4 and 7, in the process of inserting the first insulator 130 into the stator slot, grasping is conducted by the device fixture. If the height of the convex portion 1312 of the first insulator 130 is too small, grasping operability of the device fixture may be affected. Therefore, the height of the convex portion 1312 is set to be greater than or equal to 2.5 mm and less than or equal to 15 mm. In this case, grasping efficiency of the device fixture is highest and automation capability of the device is strongest. A specific height of the convex portion 1312 may be determined according to an actual process.

In specific applications, the height of the convex portion is greater than or equal to 5 mm and less than or equal to 10 mm. Further, the height of the convex portion is of 6 mm, 7 mm, 8 mm, or 9 mm.

In some embodiments, further, as shown in FIGS. 1, 3, 4 and 7, in the axial direction of the stator core 110, a second end of the first insulator 130 is provided with a concave portion 1314. The convex portion 1312 and the concave portion 1314 are opposite each other. That is, one end of the first insulator 130 in the axial direction includes a trapezoidal convex portion 1312, and the other end of the first insulator in the axial direction includes a trapezoidal concave portion 1314 having the same shape and size as the trapezoidal convex portion 1312. The convex portion 1312 facilitates grasping of the first insulator 130 by the device fixture, and the concave portion 1314 is arranged to avoid collision and interference between the first insulator and the insulation frame 150 when the first insulator 130 is inserted into the stator slot. In this way, the first insulator 130 is accurately inserted into the stator slot, and further the automation capability of the device is improved.

In some embodiments, further, as shown in FIGS. 1, 4, 5 and 7, a center line of the convex portion 1312 of the first insulator 130 is set to coincide with a center line of the concave portion 1314 of the first insulator, and the convex portion 1312 and the concave portion 1314 may be folded in half along the center line in a process of folding the first insulator 130 in half, and further straightness of the entire first insulator 130 is ensured. In this way, smoothness and accuracy of inserting the first insulator 130 into the stator slot in the axial direction are improved.

In some embodiments, further, as shown in FIGS. 1, 4, 5 and 7, the convex portion 1312 of the first insulator 130 is set to have the same shape as the concave portion 1314 of the first insulator, and it is further ensured that the center line of the convex portion 1312 may coincide with the center line of the concave portion 1314, and further the convex portion 1312 and the concave portion 1314 may be folded in half along the center line. In this way, smoothness and accuracy of inserting the first insulator 130 into the stator slot in the axial direction are improved. Meanwhile, the convex portion 1312 has the same shape as the concave portion 1314, and the convex portion and the concave portion have a simpler structure, and are easy to produce and machine, and production cost is effectively reduced.

In some embodiments, further, as shown in FIGS. 4-7, the first insulator 130 further includes a transition section 1330.

In some embodiments, as shown in FIGS. 4 and 6, the first insulation portion 1310 is connected to the second insulation portion 1320 by the transition section 1330, that is, the first insulation portion 1310 and the second insulation portion 1320 are connected into a whole by the transition section 1330, and the folding position is located in the transition section 1330. In this way, the first insulation portion 1310 and the second insulation portion 1320 may be folded in half along the folding position, and further the first insulation portion 1310 folded in half may have a greater length than the second insulation portion 1320 folded in half. Compared with a symmetrical structure having two sides of the same length in the prior art, the above structure can reduce material consumption of the first insulators 130, and reduce material cost. Meanwhile, the first insulation portion 1310 and the second insulation portion 1320 are folded in half along the folding position, and an arc-shaped transition section 1330 is formed at a joint, which is a transition section 1330, where the first insulation portion 1310 and the second insulation portion 1320 are folded in half, that is, the transition section 1330 is U-shaped after the first insulator 130 is folded in half along the folding position. After being folded in half, the first insulator 130 is bent by itself, and further a supporting elastic force exists between the first insulation portion 1310 and the second insulation portion 1320. In this way, when the first insulator 130 is inserted into the gap between the windings 120 on the two adjacent tooth portions, the first insulation portion 1310 and the second insulation portion 1320 may abut against the two adjacent groups of windings 120 by their own elastic force, and a fixing effect is enhanced, and insulation reliability is improved.

A stator 100 is provided according to another embodiment.

In addition to the features described previously, the number of the first insulators 130 is set to be multiple, and at least parts of the stator slots each accommodate a first insulator 130. Further, the windings 120 in the stator slots may be physically isolated to ensure insulation reliability.

In some embodiments, as shown in FIG. 1, the number of the stator slots may be set to be the same as that of the first insulators 130. In this way, the first insulators 130 can insulate and isolate the windings 120 in all the stator slots, and insulation reliability of an electric motor during operation is effectively improved. For instance, in some embodiments, the number of the stator slots is set to be 12, and the number of the first insulators 130 is set to be 12, that is, the number of the stator slots is equal to that of the first insulators 130, and each stator slot accommodates a first insulator 130. In this way, an insulation and isolation state of the first insulators 130 in the stator slots is optimal, and insulation reliability is ensured.

It may be understood that the number of the first insulators 130 may further be less than that of the stator slots.

In some embodiments, further, as shown in FIGS. 1-7, a thickness of the first insulator 130 is set to be 0.25 mm-0.3 mm, that is, thicknesses of the first insulation portion 1310 and the second insulation portion 1320 are set to be greater than or equal to 0.25 mm and less than or equal to 0.3 mm, and insulation and voltage resistance requirements between the adjacent windings 120 in the stator slot are ensured. Further, on one hand, by setting a thickness range of the first insulators 130, insulation breakdown between the adjacent windings 120 can be effectively prevented, and insulation reliability can be enhanced. On the other hand, by setting a thickness range of the first insulators 130, when the first insulator 130 is folded in half, the elastic force of the first insulator 130 folded in half, that is, the supporting elastic force between the first insulation portion 1310 and the second insulation portion 1320, can be improved. Further, when the first insulator 130 is inserted into the gap between the windings 120 on the two adjacent tooth portions, the first insulator may abut against the two adjacent groups of windings 120 by its own elastic force, and a fixing effect is enhanced, and insulation reliability is improved.

A stator 100 is provided to another embodiment.

In addition to the features described previously, as shown in FIGS. 1, 2 and 3, the stator core 110 includes a plurality of block cores 1102. The plurality of block cores 1102 are connected sequentially in the circumferential direction of the stator core 110. In this way, the stator slot may be defined between every two adjacent block cores 1102. Further, the stator slots are circumferentially arranged in the axial direction of the stator core 110, and the windings 120 are wound around the tooth portions and located in the stator slots. Meanwhile, the first insulators 130 are further arranged in the circumferential direction of the electric motor and correspondingly inserted into the stator slots, to physically isolate the windings 120 in the stator slots, and insulation reliability is achieved.

Figure 8:
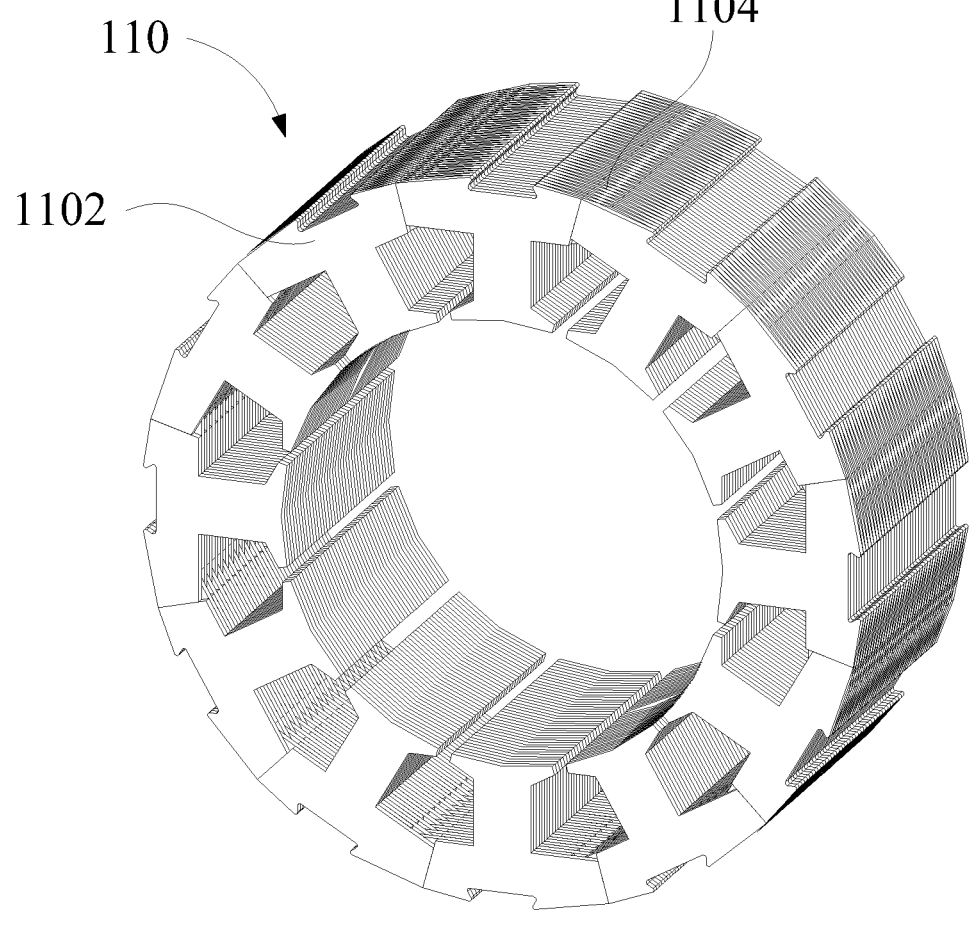
FIG. 8 is a schematic diagram of a stator core according to an embodiment of the present disclosure.

As shown in FIG. 8, further, the stator core 110 includes the plurality of block cores 1102. When the windings 120 are wound, the winding 120 may be wound around each block core 1102. After winding of all the block cores 1102 is completed, the plurality of block cores 1102 form a circle. The above arrangement effectively improves a slot fill factor of the stator 100.

In some embodiments, further, as shown in FIGS. 1-3, each block core 1102 includes a plurality of laminations, and the plurality of laminations are stacked in the axial direction of the stator core 110. In this way, overlapping portions 1104 are formed on peripheral edges of the laminations, and when the plurality of laminations are stacked in the axial direction of the core, overlapping gaps are defined between the adjacent laminations and are formed in the stator slots, and the windings 120 may be wound around the tooth portions and located in the stator slots. When the first insulator 130 is inserted into the gap between the windings 120 on the two adjacent tooth portions, the windings 120 in the stator slot are effectively and physically isolated, and further insulation reliability is ensured.

In some embodiments, the laminations are silicon steel sheets.

In some embodiments, further, as shown in FIGS. 1-3, the plurality of laminations include a first type of laminations and a second type of laminations, and the first type of laminations and the second type of laminations are distributed alternately along the axial direction of the stator core 110. In the circumferential direction of the stator core 110, first sides of the first type of laminations are provided with the overlapping portions 1104, and second sides of the first type of laminations are provided with notch portions; and meanwhile, first sides of the second type of laminations are provided with the notch portions, and second sides of the second type of laminations are provided with the overlapping portions 1104. In this way, in the axial direction of the stator core 110, at two sides of the notch portion, the two adjacent overlapping portions 1104 may define a gap, and an overlapping portion 1104 of one block core 1102 of the two adjacent block cores 1102 is inserted into a gap of another block core 1102, and further a slot fill factor of the stator is improved.

In some embodiments, when the first type of laminations and the second type of laminations are distributed alternately along the axial direction of the stator core 110, an interval exists between the overlapping portions 1104 of two adjacent ones of the first type of laminations at the first side, and an overlapping gap of the first side is directly defined at the notch portion of the second type of laminations between the two adjacent ones of the first type of laminations. Accordingly, an interval exists between the overlapping portions 1104 of two adjacent ones of the second type of laminations at the second side, and the overlapping gap of the second side is directly defined at the notch portion of the first type of laminations between the two adjacent ones of the second type of laminations. In this way, an overlapping portion 1104 of a block core 1102 may be inserted into a gap of another block core 1102, and a slot fill factor of the stator can be improved. Meanwhile, after insertion of all the block cores 1102 is completed, the plurality of block cores 1102 form a circle, and a slot fill factor of the stator can be further improved, and motor power during motor operation can be further enhanced.

In an exemplary embodiment, the above notch portion may be formed through cutting. That is, the notch portion may be formed by cutting off part of a material from the second side of the first type of lamination, and the notch portion may be formed by cutting off part of a material from the first side of the second type of lamination.

An electric motor is provided according to another embodiment. The electric motor includes: the stator 100 according to any one of previously described embodiment; and a rotor cooperating with the stator 100 to rotate.

The electric motor provided in the present disclosure includes the stator 100, so the electric motor has all the beneficial effects of the above stator 100. That is, the length of the first insulation portions 1310 and the length of the second insulation portions 1320 are optimized, and the stator is high in insulation reliability and fixability, prone to automatic production, and low in cost. Compared with a symmetrical structure having two sides of the same length in the prior art, the above structure can reduce material consumption of the first insulators 130, and reduce material cost. In this way, problems that the electric motor runs with loads and further risks are caused because a creepage distance between phases of the windings 120 may be insufficient when the first insulators 130 have an unreasonable size or the first insulators 130 are damaged or fall off in the prior art, and that the first insulators 130 have a complex structure and high machining cost can be solved. The above will not be described in detail herein In addition, the electric motor further includes the rotor. The rotor is arranged inside the stator 100 and may cooperate with the stator 100 to rotate and further output torque.

A compressor is provided according to another embodiment. The compressor includes the electric motor according to the previous embodiment.

The compressor provided in the present disclosure includes the electric motor, so the compressor further has all the beneficial effects of the above stator 100. That is, the length of the first insulation portions 1310 and the length of the second insulation portions 1320 are optimized, and the stator is high in insulation reliability and fixability, prone to automatic production, and low in cost. Compared with a symmetrical structure having two sides of the same length in the prior art, the above structure can reduce material consumption of the first insulators 130, and reduce material cost. In this way, problems that the electric motor runs with loads and further risks are caused because a creepage distance between phases of the windings 120 may be insufficient when the first insulators 130 have an unreasonable size or the first insulators 130 are damaged or fall off in the prior art, and that the first insulators 130 have a complex structure and high machining cost can be solved. The above will not be described in detail herein.

A vehicle is provided according to another embodiment. The vehicle includes the compressor according to the previous embodiment.

The vehicle provided in the present disclosure includes the compressor, so the vehicle has all the beneficial effects of the above compressor, which will not be described in details herein.

As shown in FIGS. 1-7, an exemplary embodiment of the present disclosure provides a stator 100. The stator 100 includes a stator core 110, windings 120, first insulators 130, second insulators 140, and insulation frames 150.

In some embodiments, as shown in FIGS. 1-3, with the number of stator slots of an electric motor Q=12 as an embodiment, the first insulator 130 is inserted into a stator slot defined by two adjacent cores in an axial direction of the cores, and the second insulator 140 is arranged along an inner wall of the stator slot. The insulation frames 150 are placed on two sides of an end surface of the stator core 110 in the axial direction, and the windings 120 wound around the insulation frames 150 are placed in the stator slots. The first insulators 130 are arranged in a circumferential direction of an electric motor to physically isolate the windings 120 in the stator slots, and insulation reliability of the first insulators 130 is ensured.

In some embodiments, as shown in FIGS. 4-6, the length of one side of the first insulator 130 folded in half is greater than the length of the other side of the first insulator, that is, the first insulator 130 includes a first insulation portion 1310 and a second insulation portion 1320, the first insulation portion 1310 and the second insulation portion 1320 of the first insulator 130 are located on two sides of a protrusion 1402 of a second insulator 140, respectively, an arc-shaped transition section 1330 is formed at a joint where the first insulation portion 1310 and the second insulation portion 1320 are folded in half, and outer sides of the first insulation portion 1310 and the second insulation portion 1320 abut against the winding 120. Compared with a symmetrical structure having two sides of the same length in the prior art, the above structure can reduce material consumption of the first insulators 130, and reduce material cost.

In specific applications, the first insulator 130 employs phase insulation, and the second insulator 140 employs slot insulation. It may be understood that windings 120 of different phases are wound around the two adjacent tooth portions, the phase insulation is employed between the windings 120 of different phases on the two adjacent tooth portions, and is configured to insulate the windings 120 of different phases, and the slot insulation is configured to insulate an inner wall surface of the stator slot and the windings 120 are wound around the tooth portions by the slot insulation to play an insulation role.

In addition, within the same stator slot, the first insulation portion 1310 is in contact with one group of the windings 120, and the second insulation portion 1320 is in contact with another group of the windings 120. That is, the first insulator 130 connects the two adjacent groups of windings 120 simultaneously. In this way, the first insulator 130 abuts against the two adjacent groups of windings 120 through an elastic force formed by bending of the first insulator, and a fixing effect is enhanced, a problem that insulation falls off when only a single piece of insulation paper is used for phase-to-phase isolation in the prior art is effectively solved, and a fixing effect of the first insulators 130 is enhanced while insulation reliability of the first insulators 130 is ensured. In addition, the length of the first insulation portion 1310 folded in half is greater than the length of the second insulation portion 1320 folded in half, and material consumption is small, material cost is low, a model is simple, the stator is easy to produce and machine, and production cost is low.

In some embodiments, as shown in FIG. 7, one end of the first insulator 130 in the axial direction includes a trapezoidal convex portion 1312, and the other end of the first insulator in the axial direction includes a trapezoidal concave portion 1314 having the same shape and size as the trapezoidal convex portion 1312. A center line of the trapezoidal convex portion 1312 coincides with a center line of the trapezoidal concave portion 1314. For the first insulator 130, the convex portion 1312 is fixed by a device, and the concave portion 1314 is inserted into the stator slot in the axial direction.

In some embodiments, as shown in FIGS. 1 and 6, a height difference between the first insulation portion 1310 and the second insulation portion 1320 is greater than a height of the second insulator 140 protruding into a slot, that is, a height of the protrusion 1402, and it may be ensured that the winding 120 is isolated by three layers of insulation formed by the first insulation portion 1310 of the first insulator 130 and the protrusion 1402, protruding into the slot, of the second insulator 140 at an inner bottom of the stator slot. The windings 120 at a bottom of the stator slot of the electric motor are closely spaced, and the three layers of insulation can further improve phase-to-phase insulation reliability, and meanwhile, interference between the second insulation portion 1320 and the protrusion 1402 in the second insulator 140 when the first insulator 130 is inserted into the stator slot can be avoided. The second insulation portion 1320 and the first insulation portion 1310 constitute two layers of insulation space, and insulation reliability is ensured, and meanwhile, the first insulator may abut against the adjacent windings 120 through an elastic force formed by bending of the first insulator. In this way, a fixing effect is achieved, and a probability that insulation may easily fall off when only a single piece of insulation paper is used for phase-to-phase isolation is eliminated. Further, the length of one side of the first insulator 130 is greater than the length of the other side of the first insulator. Compared with a symmetrical structure having two sides of the same length, the above structure can reduce material consumption of the first insulators 130, and reduce material cost.

In specific applications, when the stator 100 is assembled, the second insulator 140 is mounted in the stator slot, and then the first insulator 130 is inserted into the stator slot, and interference between the first insulator 130 and the second insulator 140 can be avoided through the above size settings.

In some embodiments, as shown in FIGS. 1 and 7, the stator core 110 has an axial length L1, the first insulator 130 without the convex portion 1312 has an axial length L2, and L2≥L1+7 mm. 7 mm is a process size determined by considering the height of the windings 120 at an end. That is, when the first insulator 130 is mounted in the stator slot, at least part of the convex portion 1312 may protrude from the stator core 110 to facilitate assembly and disassembly of the first insulator 130. Meanwhile, a size of part, in the stator slot, of the first insulator 130 may be ensured, and the size of the part, in the stator slot, of the first insulator 130 may be greater than or equal to that of the stator slot, and an insulation effect of the first insulator 130 on the adjacent windings 120 is ensured. In this way, insulation breakdown between the adjacent windings 120 at the end may be prevented while insulation performance of straight sections of every two adjacent windings 120 in the stator slot may be ensured, and insulation reliability is enhanced.

In some embodiments, as shown in FIGS. 1 and 7, the height of the trapezoidal convex portion 1312 is greater than or equal to 3 mm. In specific applications, the height of the convex portion is greater than or equal to 5 mm and less than or equal to 10 mm. Further, the height of the convex portion is of 6 mm, 7 mm, 8 mm, or 9 mm. The upper bottom of the trapezoidal convex portion 1312 of the first insulator 130 is 1 mm shorter than the lower bottom of the trapezoidal convex portion 1312, and a device fixture may insert the first insulator 130 into the stator slot in the axial direction through grasping, and further automation capability and simplicity of a device are improved. Too small a length of the convex portion 1312 affects operability of the device. The height 3 mm of the trapezoidal convex portion 1312 is determined according to an actual process. The concave portion 1314 can avoid collision and interference between the first insulator and the insulation frame 150 when the first insulator 130 is inserted.

In addition, the number of the first insulators 130 does not exceed the number of the stator slots of the electric motor. In some embodiments, the number of the stator slots is 12, and the number of the first insulators 130 is 12. When the number of the first insulators 130 is equal to that of the stator slots, each stator slot accommodates a first insulator 130. In this case, an insulation effect of the adjacent windings 120 in each stator slot is desirable.

In addition, the thickness of a single side of the first insulator 130 is greater than or equal to 0.25 mm and less than or equal to 0.3 mm, and insulation and voltage resistance requirements between the adjacent windings 120 in the stator slot are ensured.

In addition, the first insulators 130 are made of polyphenylene sulfide (PPS), which has a desirable insulation effect, high temperature resistance and strong compatibility with a working environment.

In conclusion, according to the stator 100 provided in exemplary embodiments of the present disclosure, the stator core 110 includes the plurality of tooth portions, and the plurality of tooth portions are distributed along the circumferential direction of the stator core 110. The stator slot is provided between the two adjacent tooth portions. The windings 120 are wound around the tooth portions, and located in the stator slots. In addition, the first insulators 130 are inserted into gaps between the windings 120 on the two adjacent tooth portions, and at least parts of the first insulators 130 are located at the gaps between the windings 120 on the two adjacent tooth portions. In this way, the windings 120 in the stator slots can be effectively and physically isolated, and insulation reliability can be ensured. The length of one side of the first insulator 130 folded in half is greater than the length of the other side of the first insulator, that is, the first insulator 130 includes the first insulation portion 1310 and the second insulation portion 1320, the first insulation portion 1310 and the second insulation portion 1320 of the first insulator 130 are located on two sides of the protrusion 1402 of the second insulator 140, respectively, the arc-shaped transition section 1330 is formed at the joint where the first insulation portion 1310 and the second insulation portion 1320 are folded in half, and the outer sides of the first insulation portion 1310 and the second insulation portion 1320 abut against the winding 120. The first insulators 130 in a folded state are optimized, that is, the length of the first insulation portions 1310 and the length of the second insulation portions 1320 are optimized, and the stator is high in insulation reliability and fixability, prone to automatic production, and low in cost.

In the present disclosure, "a plurality of" means two or more, unless expressly specified otherwise. The terms "mount", "connection", "connected", "fix", etc. should be construed broadly. For instance, the "connected" can be fixedly connected, or detachably connected, or integrally connected. The "connection" may be direct connection, or indirect connection through an intermediary medium. For those of ordinary skill in the art, the specific meanings of the above terms in the present disclosure can be understood according to specific circumstances.

In the description, the terms "an embodiment", "some embodiments", "specific embodiment", etc. indicate that specific features, structures, materials or characteristics described in conjunction with the embodiment or illustrative description are included in at least one embodiment or instance of the present disclosure. In the description, the schematic descriptions of the above terms do not necessarily refer to the same embodiment or instance. Moreover, the specific features, structures, materials or characteristics described can be combined in a suitable manner in any one or more embodiments or instances.

The foregoing is merely illustrative of some embodiments of the present disclosure and is not intended to limit the present disclosure, and various changes and modifications can be made by those skilled in the art. Any modifications, equivalent substitutions, improvements, etc. made within the spirit and principle of the present disclosure should fall within the scope of protection of the present disclosure.

What is claimed is:

1. A stator comprising:
   a stator core comprising a plurality of tooth portions distributed along a circumferential direction of the stator core and forming stator slots between each pair of adjacent tooth portions of the tooth portions;
   windings wound around the tooth portions and extending into the stator slots;
   first insulators at least partially disposed between each pair of adjacent windings of the windings; and
   second insulators, separate from the first insulators, arranged in the stator slots and comprising protrusions, wherein:
   the first insulators comprise respective first insulation portions portion and second insulation portions connected to each other and to respective windings;
   in a cross-section perpendicular to an axial direction of the stator core, the first insulators are u-shaped and a length of the first insulation portion is greater than a length of the second insulation portion;
   the protrusions are disposed between the first insulation portions and the second insulation portions;
   at least parts of the second insulators extend along slot walls of the stator slots; and
   at least parts of the windings are connected to the tooth portions by the second insulators.

2. The stator according to claim 1, wherein:
   the second insulation portions and the protrusions are located on same sides of the first insulation portions, and the first insulation portions are connected to the protrusions; and
   in the cross-section perpendicular to the axial direction of the stator core, the lengths of the first insulation portions are H1, the lengths of the second insulation portions are H2, the lengths of the protrusions are H3, and the difference between H1 and H2 is greater than H3.

3. The stator according to claim 1, further comprising insulation frames, wherein the insulation frames are arranged at respective ends of the stator core in the axial direction of the stator core, and the windings are wound around the tooth portions and covered with the insulation frames and the second insulators.

4. The stator according to claim 1, wherein:

the first insulators are configured with a folding position, and the first insulators have at least a first state and a second state;

in the first state, the first insulators are unfolded, and the first insulation portions and the second insulation portions are adjacent to each other; and in the second state, the first insulators are folded along the folding position and the first insulation portions and the second insulation portions are opposite each other.

5. The stator according to claim 4, wherein, in the axial direction of the stator core, the first ends of the first insulators are provided with convex portions, and the first insulators extend into the stator slots by grasping the convex portions.

6. The stator according to claim 5, wherein, in the axial direction of the stator core, the length of the stator core is L1, the difference between the lengths of the first insulators and the lengths of the convex portions is L2, and L2 minus L1 is greater than or equal to 7 mm.

7. The stator according to claim 5, wherein, in the first state, the convex portions have a trapezoidal shape with an upper bottom length as L3 and a lower bottom length as L4, where the difference between L4 and L3 is greater than or equal to 1 mm.

8. The stator according to claim 5, wherein heights of the convex portions are greater than or equal to 2.5 mm and less than or equal to 15 mm.

9. The stator according to claim 5, wherein, in the axial direction of the stator core, the second ends of the first insulators are provided with concave portions, and the concave portions and the convex portions are opposite each other.

10. The stator according to claim 9, wherein:

the center lines of the concave portions coincide with center lines of the convex portions; and/or the concave portions have a same shape as the convex portions.

11. The stator according to claim 4, further comprising transition sections, wherein the first insulation portions are connected to the second insulation portions by the transition sections, and the folding positions are located in the transition sections.

12. The stator according to claim 1, wherein at least parts of the stator slots are internally provided with the first insulators.

13. The stator according to claim 1, wherein a thickness of the first insulators is greater than or equal to 0.25 mm and less than or equal to 0.3 mm.

14. The stator according to claim 1, wherein:

the stator core comprises a plurality of block cores, and the plurality of block cores are connected sequentially in the circumferential direction of the stator core.

15. The stator according to claim 14, wherein each of the block cores comprises a plurality of laminations stacked in the axial direction of the stator core.

16. The stator according to claim 15, wherein:

the plurality of laminations comprises a first type of laminations and a second type of laminations overlapping each other;

in the circumferential direction of the stator core, first sides of the first type of laminations are provided with overlapping portions, and second sides of the first type of laminations are provided with notch portions;

second sides of the second type of laminations are provided with the overlapping portions, and first sides of the second type of laminations are provided with the notch portions; and in the axial direction of the stator core, two adjacent overlapping portions are located on two sides of the notch portion and define a gap, and in two adjacent block cores, the overlapping portion of one of the block cores is inserted into a gap of another block core.

17. An electric motor comprising:

the stator according to claim 1; and a rotor cooperating with the stator and configured to rotate.

18. A compressor comprising the electric motor according to claim 17.

19. A vehicle comprising the compressor according to claim 18.

20. The stator according to claim 1, wherein, in the cross-section perpendicular to the axial direction of the stator core, centerlines of the protrusions of the second insulators that run through a center of the stator are aligned with centerlines of the first insulators that run through the center of the stator.

\* \* \* \* \*